US012637081B2

(12) United States Patent     (10) Patent No.:   US 12,637,081 B2

Robson et al.     (45) Date of Patent:    May 26, 2026

---

(54) SYSTEM AND METHOD OF CONTROLLING AXLE HOP IN A VEHICLE

(71) Applicant: NISSAN NORTH AMERICA, INC., Franklin, TN (US)

(72) Inventors: Paul Robson, Chandler, AZ (US); Scott Warnecke, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 412 days.

(21) Appl. No.: 17/877,855

(22) Filed: Jul. 29, 2022

(65) Prior Publication Data

US 2024/0034323 A1     Feb. 1, 2024

(51) Int. Cl.
| | |
|---|---|
| *B60W 30/18* | (2012.01) |
| *B60K 28/16* | (2006.01) |
| *B60W 10/06* | (2006.01) |
| *B60W 10/119* | (2012.01) |
| *B60W 30/182* | (2020.01) |

(52) U.S. Cl.
CPC ....... *B60W 30/18172* (2013.01); *B60K 28/16* (2013.01); *B60W 10/06* (2013.01); *B60W 10/119* (2013.01); *B60W 30/182* (2013.01); *B60W 2510/12* (2013.01); *B60W 2520/26* (2013.01); *B60W 2710/0666* (2013.01)

(58) Field of Classification Search
None
See application file for complete search history.

---

(56) References Cited

U.S. PATENT DOCUMENTS

| | | | | |
|---|---|---|---|---|
| 5,213,177 A | * | 5/1993 | May | B60K 28/16 |
| | | | | 701/84 |
| 6,314,342 B1 | | 11/2001 | Kramer et al. | |
| 7,315,774 B2 | | 1/2008 | Morris | |
| 8,676,465 B2 | * | 3/2014 | Oshima | B60T 8/1706 |
| | | | | 701/84 |
| 10,112,615 B2 | * | 10/2018 | Hertel | B60W 30/02 |
| 10,994,746 B2 | | 5/2021 | Robson et al. | |
| 2006/0108163 A1 | * | 5/2006 | Kitano | B60W 10/08 |
| | | | | 180/65.26 |
| 2009/0107747 A1 | * | 4/2009 | Luehrsen | B60T 8/175 |
| | | | | 180/197 |

(Continued)

FOREIGN PATENT DOCUMENTS

| | | |
|---|---|---|
| WO | 2020018097 A1 | 1/2020 |

OTHER PUBLICATIONS

U.S. Appl. No. 17/364,810; Vehicle Body Structure; G Byme, filed Jun. 30, 2021.

*Primary Examiner* — Vivek D Koppikar
*Assistant Examiner* — David Ruben Pedersen
(74) *Attorney, Agent, or Firm* — Spencer Fane, LLP

(57) ABSTRACT

A control system for controlling axle hop in a vehicle includes a sensor and an electronic controller. The sensor is configured to detect a vibration of an axle and to detect a wheel slip of a wheel. The electronic controller is configured to determine whether one of the detected axle vibration exceeds a first predetermined threshold or the detected wheel slip exceeds a second predetermined threshold. An engine traction control system is started upon determining that the one of the detected axle vibration exceeds the first predetermined threshold or that the detected wheel slip exceeds the second predetermined threshold.

12 Claims, 6 Drawing Sheets

(56) References Cited

U.S. PATENT DOCUMENTS

| | | | |
|---|---|---|---|
| 2012/0197506 A1* | 8/2012 | Reynolds | B60T 8/17636 |
| | | | 701/84 |
| 2017/0066447 A1* | 3/2017 | Hertel | B60W 10/02 |
| 2017/0246955 A1* | 8/2017 | Richards | B60T 8/86 |
| 2018/0111625 A1* | 4/2018 | James | B60W 30/18009 |
| 2020/0031366 A1* | 1/2020 | Robson | B60C 23/0406 |
| 2020/0164869 A1* | 5/2020 | Watanabe | B60W 40/068 |
| 2021/0078581 A1* | 3/2021 | Velazquez Alcantar | |
| | | | B60L 3/10 |

* cited by examiner

SYSTEM AND METHOD OF CONTROLLING AXLE HOP IN A VEHICLE

BACKGROUND

Technical Field

The present disclosure generally relates to a system and method of controlling axle hop in a vehicle. More specifically, the present disclosure relates to a system and method of controlling axle hop in a vehicle when one of a detected axle vibration or a detected wheel slip exceeds a respective predetermined threshold.

Background Information

High torque transmitted to an axle in combination with wheel slip can cause vertical vibration, or hop, of the axle.

SUMMARY

A need exists for a system and method of controlling axle hop in a vehicle.

In view of the state of the known technology, one aspect of the present disclosure is to provide a control system for controlling axle hop in a vehicle. The control system includes a sensor and an electronic controller. The sensor is configured to detect a vibration of an axle and to detect a wheel slip of a wheel. The electronic controller is configured to determine whether one of the detected axle vibration exceeds a first predetermined threshold or the detected wheel slip exceeds a second predetermined threshold. An engine traction control system is started upon determining that the one of the detected axle vibration exceeds the first predetermined threshold or that the detected wheel slip exceeds the second predetermined threshold.

Another aspect of the present disclosure is to provide a method for controlling axle hop in a vehicle. A vibration of an axle is detected. A wheel slip of a wheel is detected. Whether the detected axle vibration exceeds a first predetermined threshold is determined. Whether the detected wheel slip exceeds a second predetermined threshold is determined. Whether one of the detected axle vibration exceeds a first predetermined threshold or the detected wheel slip exceeds a second predetermined threshold is determined. An engine traction control system is started upon determining that the one of the detected axle vibration exceeds the first predetermined threshold or the detected wheel slip exceeds the second predetermined threshold.

Also other objects, features, aspects and advantages of the disclosed system and method of controlling axle hop in a vehicle will become apparent to those skilled in the art from the following detailed description, which, taken in conjunction with the annexed drawings, discloses exemplary embodiments of the system and method of controlling axle hop in a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
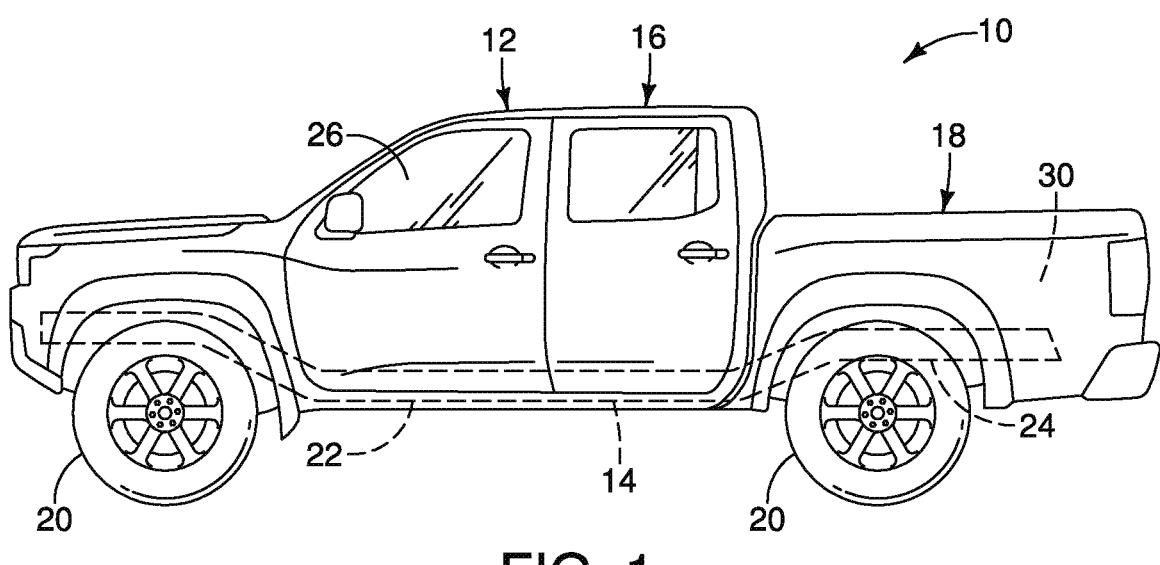
FIG. 1 is a side elevational view of a vehicle in accordance with an exemplary embodiment.

Referring initially to FIG. 1, a vehicle 10 having a vehicle body structure 12 that includes a vehicle frame structure 14, a cabin structure 16 and a cargo area structure 18 is illustrated in accordance with a first embodiment. Wheels 20 are rotatably connected to the vehicle body structure 12 in a conventional manner.

The frame structure 14 extends beneath the cabin structure 16 and the cargo area structure 18. More specifically, the vehicle frame structure 14 has a forward portion 22 and a rearward portion 24. The cabin structure 16 is installed to the forward portion 22 and the cargo area structure 18 is installed to the rearward portion 24. The cabin structure 16 defines a passenger compartment 26. The cargo area structure 18 defines a cargo bed 30.

Figure 2:
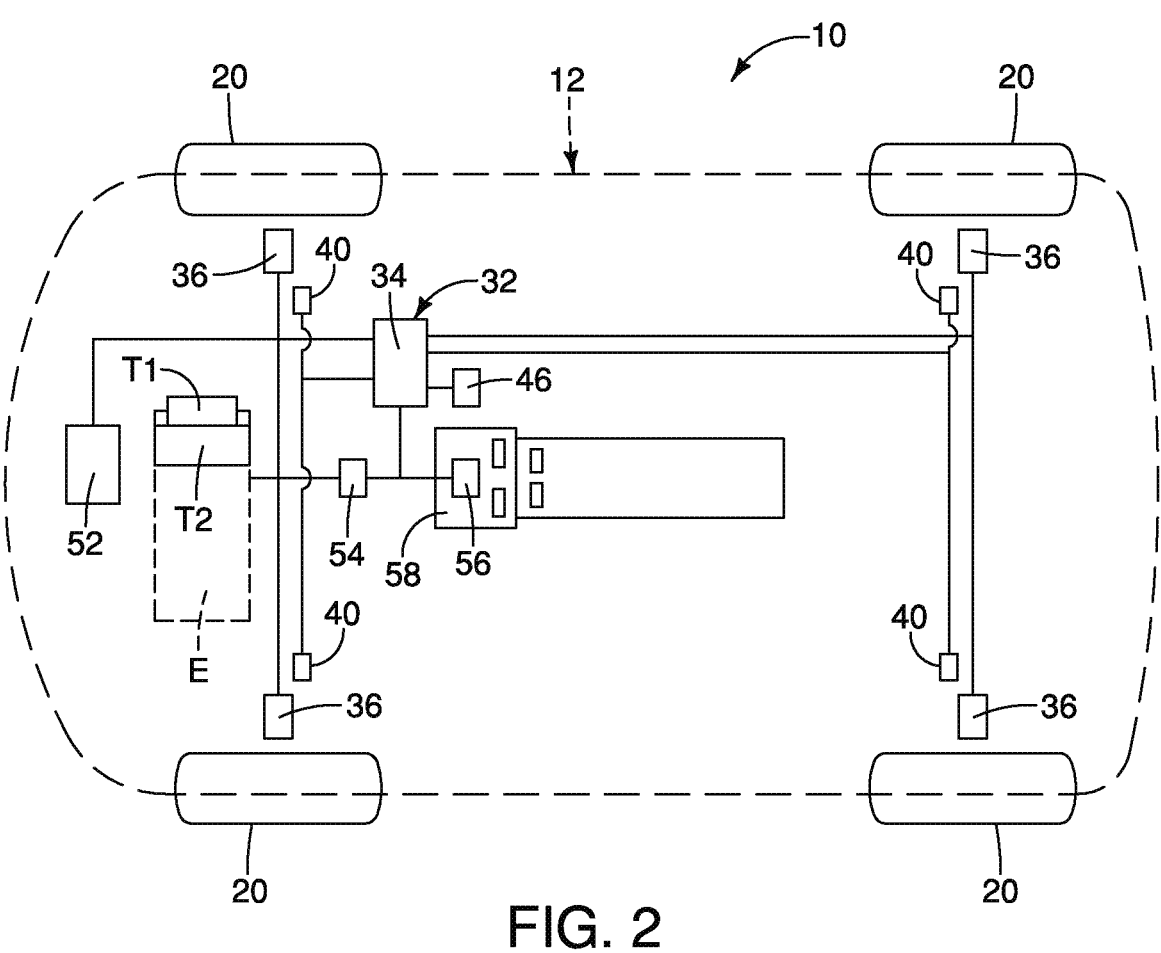
FIG. 2 is a schematic diagram of the vehicle of FIG. 1 including the axle hop control system in accordance with the exemplary embodiment.

A vehicle dynamic control monitoring system 32 includes an electronic controller 34 that is connected to and/or is in electronic communication with various systems and components of the vehicle 10 that are installed to locations within or on the vehicle body structure 12, as shown in FIG. 2.

The vehicle 10 includes a power plant E operated by a vehicle operator, as shown in FIG. 2. The power plant E provides rotary power to a transmission T1 and a four-wheel drive transfer case T2, in a conventional manner. The transmission T1 and the four-wheel drive transfer case T2 are shown schematically in FIGS. 2 and 4. However, it should be understood from the drawings and the description herein that the transmission T1 and/or the four-wheel drive transfer case T2 include drive shafts (not shown) and differential gears (not shown) that connect the transmission T1 and the four-wheel drive transfer case T2 to each of the four tires 20 for transference of rotary power from the power plant E, in a conventional manner. It should further be understood from the drawings and the description herein that the vehicle 10 further includes many body, suspension, structural components and vehicle systems that are conventional features, structures and systems. Because these features, structures and systems are conventional, further description is omitted for the sake of brevity.

The transmission T1 and the four-wheel drive transfer case T2 define a four-wheel drive transmission assembly that receives rotary power from the vehicle power plant E, and is configured to switch between transmitting rotary power via at least a four-wheel drive low setting and a four-wheel drive high setting. The four-wheel drive low setting is defined by a first set of gear ratios that produce vehicle speeds within a first set of speed ranges and the four-wheel drive high setting is defined by a second set of gear ratios that produce vehicle speeds within a second set of speed ranges, each one of the second set of speed ranges being greater than the corresponding ones of first set of speed ranges. Four-wheel drive transmissions are conventional mechanical devices, and further description is omitted for the sake of brevity.

Figure 3:
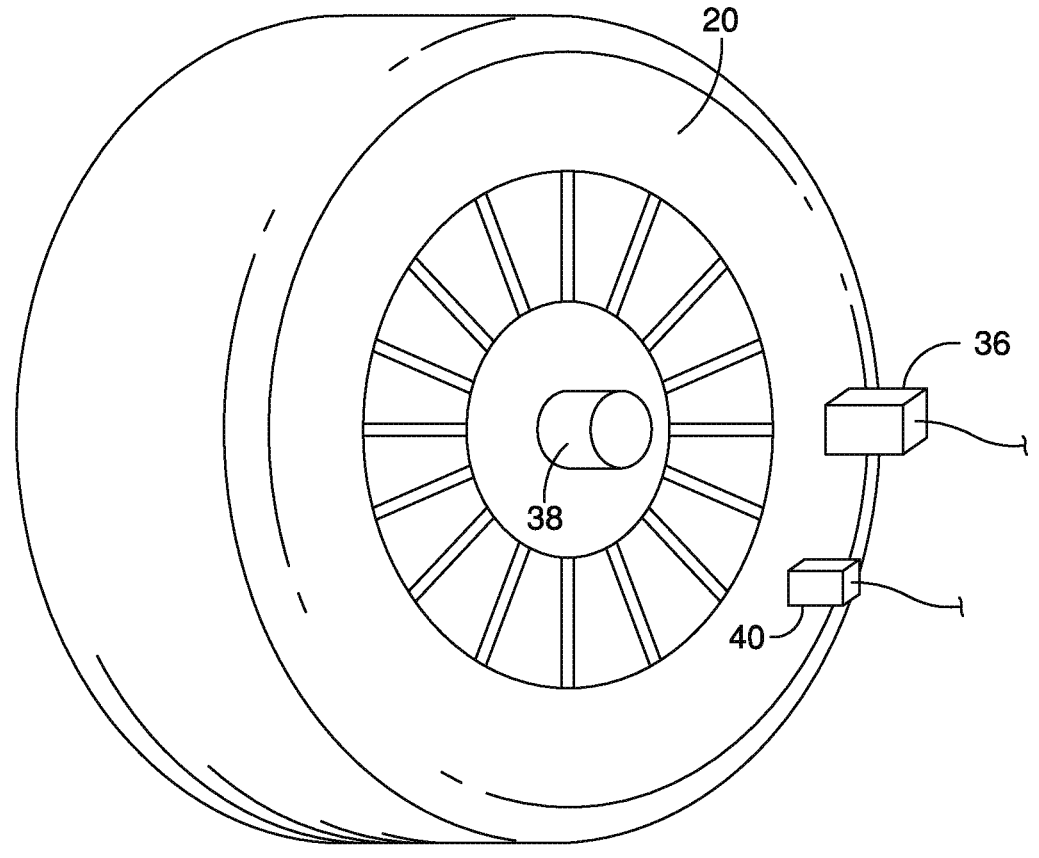
FIG. 3 is a perspective view of a tire and sensor of the vehicle of FIGS. 1 and 2.

The vehicle 10 includes a first sensor 36 configured to detect a vibration of an axle 38 and a wheel slip of a wheel 20, as shown in FIGS. 2 and 3, The sensor 36 is configured to detect the wheel speed of the wheel 20. The detected wheel speed is compared to a second predetermined threshold to determine whether the wheel 20 is slipping. Wheel slip can be determined in any suitable manner, such as when the detected wheel slip exceeds a first predetermined threshold or when the wheel slip exceeds the first predetermined threshold by a predetermined amount. The wheel speed signal received by the sensor 36 includes noise from the road surface. The noise can be processed to determine the roughness of the road or the axle hop. The magnitude of the noise in the wheel speed signal indicates movement of the end of the axle 38. A map of axle hop versus axle end movement can be generated from the axle movement and signal noise relationship over a range of axle end movement scenes, which is then used to determine an axle hop threshold. Alternatively, any suitable manner can be used to set an axle hop threshold. As shown in FIGS. 2 and 3, the first sensor 36 is disposed adjacent each of the wheels 20, to determine the axle hop and wheel slip at each wheel 20. The first sensor 36 is preferably a conventional wheel speed sensor configured to detect axle hop and wheel slip in a conventional manner.

Alternatively, a second sensor 40 is disposed on the axle 38 adjacent each wheel 20, as shown in FIGS. 2 and 3. Each second sensor 40 is configured to determine axle hop at the axle end adjacent each wheel 20. The second sensor 40 is preferably an accelerometer configured to detect vibration at the axle end.

The vehicle dynamic control monitoring system 32 includes a Vehicle Dynamic Control system 42 (VDC system) is configured to maintain longitudinal and lateral stability of the vehicle 10. The VDC system 42 is connected to the electronic controller 34, a hydraulic or electric braking system controller 44, and the power plant E. The VDC system 42 and the electronic controller 34 receive signals from various sensors that monitor the vehicle condition and make appropriate interventions to maintain stability. The VDC system 42 and more specifically, the electronic controller 34, can monitor and control various systems of the vehicle 10 in order to maintain vehicle stability, such as utilizing an anti-lock brake system 46 (ABS 46), a traction control system 48 (TCS 48), and an active yaw control system 50 (AYC 50), which are described in greater detail below.

The anti-lock brake system 46 is a system that operates to prevent me or more of the wheels 20 from locking up during a braking operation. The ABS 46 is connected to the first sensors 36 that actively measure the rotational speed of each of the wheels 20.

Figure 4:
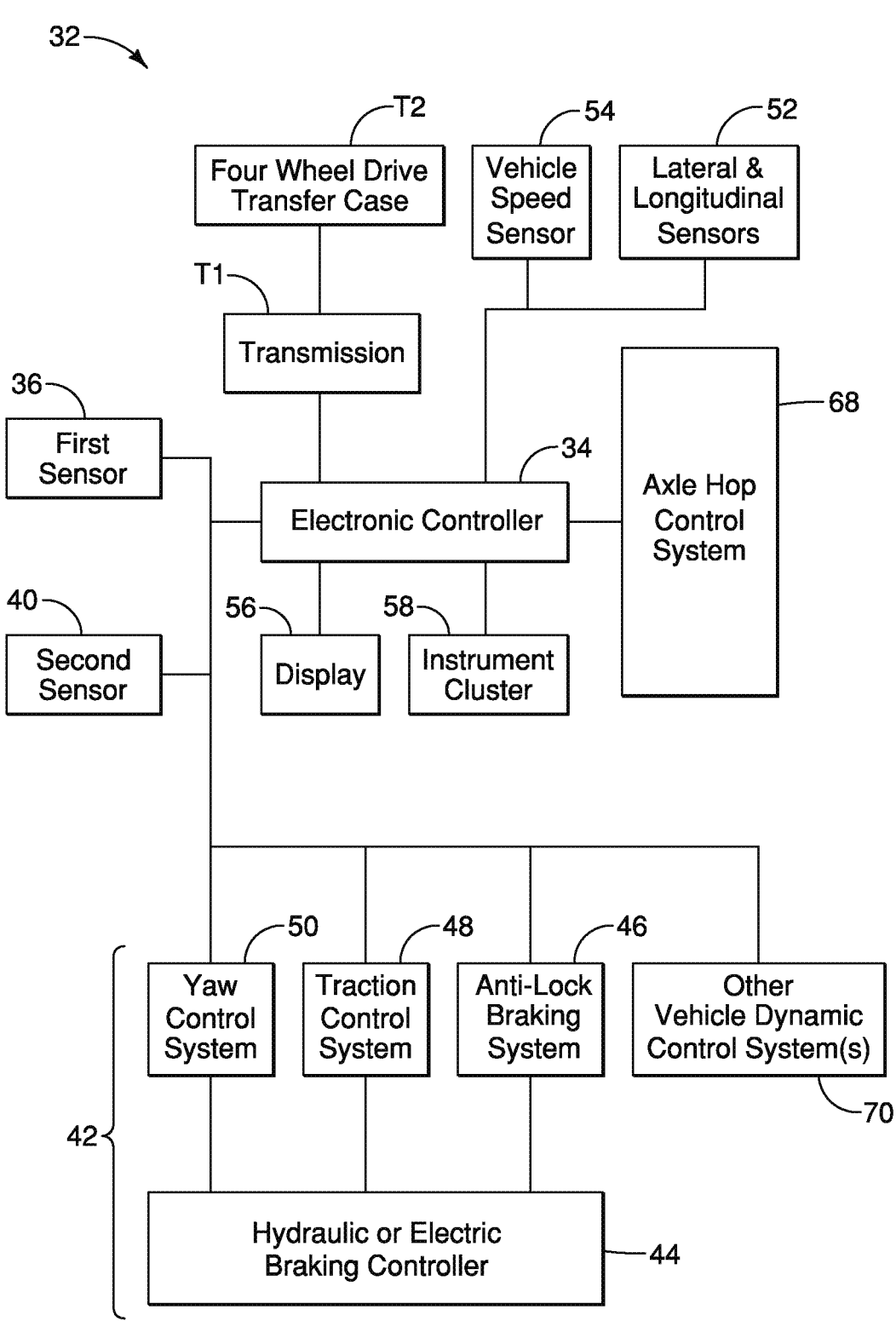
FIG. 4 is a block diagram of the axle hop control system of the vehicle of FIGS. 1 and 2.

The ABS 46 is also connected to one or more longitudinal and lateral sensor arrays 52, as shown in FIG. 4, that determine longitudinal and lateral levels or orientation of the vehicle 10. The speed signals from the first sensors 36 and the orientation data from the longitudinal and lateral sensors 52 are transmitted to the electronic controller 34. The ABS 46 is further connected to the hydraulic or electric braking system controller 44 such that any one (or more) of the wheels 20 can be allowed to rotate, rather than locking up, by controlling the braking force (hydraulic pressure) applied to the brake rotor of that wheel 20 or wheels 20, The ABS 46 facilitates maintaining stability of the vehicle 10 during braking operations and reduces stopping distance on some surfaces.

The traction control system 48 (TCS) is configured to prevent loss of traction of each of the wheels 20 while driving in on-road conditions. The wheel speeds of each of the wheels 20 as measured by each of the first sensors 36 is provided to the electronic controller 34. When the electronic controller 34 detects that one or more of the wheels 20 is rotating more quickly than the others, wheel slip of that wheel 20 is indicated. Alternatively, wheel slip can be determined by comparing the detected wheel speed to a predetermined threshold.

The active yaw control system 50 (AYC) is a system that recognizes a loss of vehicle lateral grip (skidding) of the vehicle 10 is imminent. When imminent slip is detected, AYC 52 intervenes to prevent the loss of grip by utilizing the residual grip on non-slipping wheels to impart corrective moments to the vehicle 10. The condition of the vehicle 10 is monitored by a series of sensors including but not limited to wheel speed, steering angle, and yaw (rotational moment) via the first sensors 36, the longitudinal and lateral sensor arrays 52 and sensors on the steering linkage and/or steering column (not shown). The AYC 52 uses selective braking interventions to generate desired counteracting force to slip moment, so that the car reacts as the driver intends.

The vehicle dynamic control monitoring system 32 can further include an optional vehicle speed sensor 52, a display 56, and an instrument cluster 58. The vehicle speed sensor 52 can be connected to, for example, the transmission T1 or the output shaft of the transfer case T2 and measures the speed of the vehicle 10. Alternatively, the vehicle speed can be determined by the signals received from the sensor 36. The display 58 can be a video monitor or touch screen display installed to an instrument panel within the passenger compartment of the vehicle 10 in a location easily observed by the vehicle operator. The display 56 can be part of the instrument cluster 58 or can be installed at a location spaced apart from the instrument cluster 58.

Figure 5:
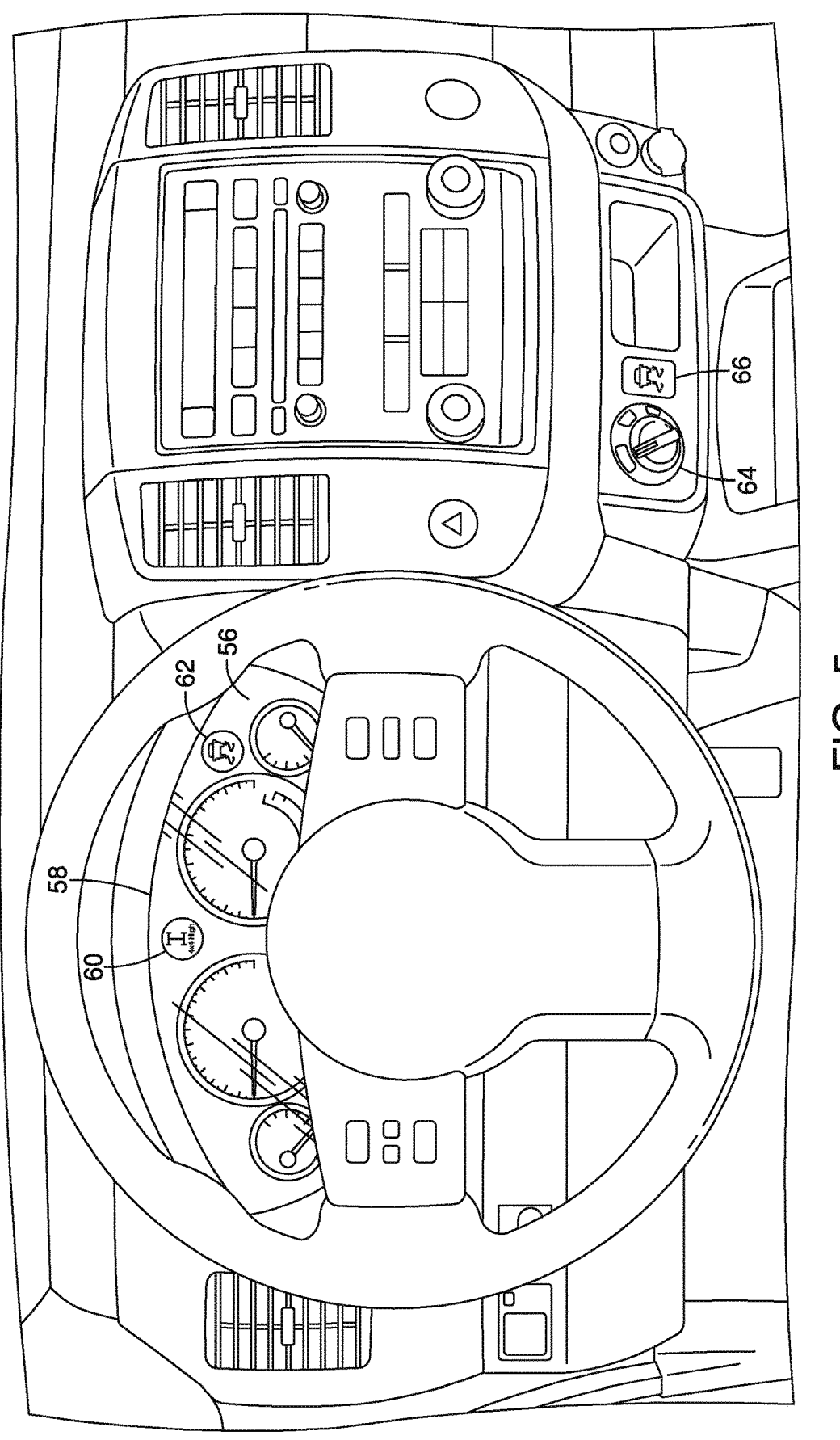
FIG. 5 is a perspective view of an instrument panel of the vehicle of FIGS. 1 and 2.

The instrument cluster 58, as shown in FIG. 5, includes a speedometer, a tachometer, and at least two lamps 60 and 62. The first lamp 60 is illuminated in response to the four-wheel drive (4WD) system being activated. The second lamp 62 is illuminated in response to the VDC system 42 being activated. The dashboard includes a 4WD system knob 64 that is operated to set an operational mode of the 4WD system. The first lamp 60 is illuminated indicating the 4WD system is set to the 4WD high mode. A VDC button 66 is pushed to turn on and off the VDC system 42. As shown in FIG. 5, the first lamp 60 is illuminated indicating the vehicle 10 is operating in 4WD high mode, and the second lamp 62 is illuminated indicating the VDC system 42 is on (activated).

The VDC system 42 further includes other vehicle dynamic control systems 70, such as an electronic brake distribution system, a brake assist system, a hill start assist system, a hill descent control system, and an electronic stability control system. When the VDC system 42 is turned off (VDC button 66 pushed to the off mode), the anti-lock braking system is active, the electronic brake distribution system is active, the brake assist system is active, the traction control system is deactivated, the hill start assist system is active, the hill descent control system is deactivated, and the electronic stability control system is in a hibernation mode until a brake is applied. When the VDC system 42 is turned on (VDC button 66 pushed to the on mode), the anti-lock braking system is active, the electronic brake distribution system is active, the brake assist system is active, the traction control system is active, the hill start assist system is active, the hill descent control system is active, and the electronic stability control system is active. The VDC system 42 can be configured in any suitable manner.

The VDC system 42 (and related systems) typically have associated therewith a vehicle mapping model (vehicle map) that is based on extensive driving tests and drive modelling of each vehicle model. In other words, each vehicle (a specific SUV design, a specific four-wheel drive vehicle, etc.) has its own constructed vehicle map stored in memory and is used by the electronic controller 34 such that each anticipated challenge, such as the vehicle 10 moving over a patch of ice, or driving on a slippery surface, is met with action initiated by the electronic controller 34 to stabilize the movement of the vehicle. Because such vehicle models are conventional and vary from vehicle model to vehicle model, further description is omitted for the sake of brevity.

The electronic controller 34 preferably includes a microcomputer with a vehicle dynamic control monitoring system control program that controls the axle hop monitoring system 68, the display 56, and the VDC system 42, including the hydraulic or electric braking system controller 44, the ABS 46, the TCS 48 and the AYC 50, as described herein. The electronic controller 34 can also include other conventional components, such as an input interface circuit, an output interface circuit, and storage devices, such as a ROM (Read Only Memory) device and a RAM (Random Access Memory) device and electronic storage devices or drives (all hereinafter referred to collectively as electronic memory). The microcomputer of the electronic controller 34 is programmed to control the vehicle dynamic control monitoring system 32. The memory circuit stores processing results and control programs such as ones for the vehicle dynamic control monitoring system 32 operations that are run by the processor circuit. The electronic controller 34 is operatively coupled to the various vehicle components and components of the vehicle dynamic control monitoring system 34 in a conventional manner. The internal RAM of the electronic controller 34 stores statuses of operational flags and various control data. The internal ROM of the electronic controller 34 stores data communication protocols and commands for various operations. The electronic controller 34 is capable of selectively controlling any of the components of the control system of the vehicle dynamic control monitoring system 32 in accordance with the control program. It will be apparent to those skilled in the art from this disclosure that the precise structure and algorithms for the electronic controller 34 can be any combination of hardware and software that will carry out the functions of the vehicle dynamic control monitoring system 32.

The electronic controller 34 installed within the vehicle body structure 12 and is in electronic communication with the electronic memory, transmission T1, the four-wheel drive transfer case T2, the axle hop monitoring system 68 (including the first and second sensors 36 and 40), the VDC system 42 (including the ABS 46, the TCS 48, and the AYC 50), hydraulic or electric braking system controller 44, sensor array 52, the vehicle speed sensor 54, the display 56 and the instrument cluster 58.

The electronic memory of the electronic controller 34 stores at least a first predetermined threshold and a second predetermined threshold for determining axle vibration and wheel slip at each wheel 20. The first predetermined threshold is used to determine axle vibration of an end of the axle 38 for each wheel. The second predetermined threshold is used to determined wheel slip of a wheel for each wheel 20. The first and second predetermined thresholds vary between different makes and models of vehicles. The first and second predetermined thresholds for a specific make and model of vehicle can be determined by conventional testing.

The electronic controller 34 is configured to perform a plurality of tasks and operations, and, is programed to evaluate and process data from the various sensors and systems connected thereto, along with data relating to various on-road and off-road conditions, such as those described below.

Figure 6:
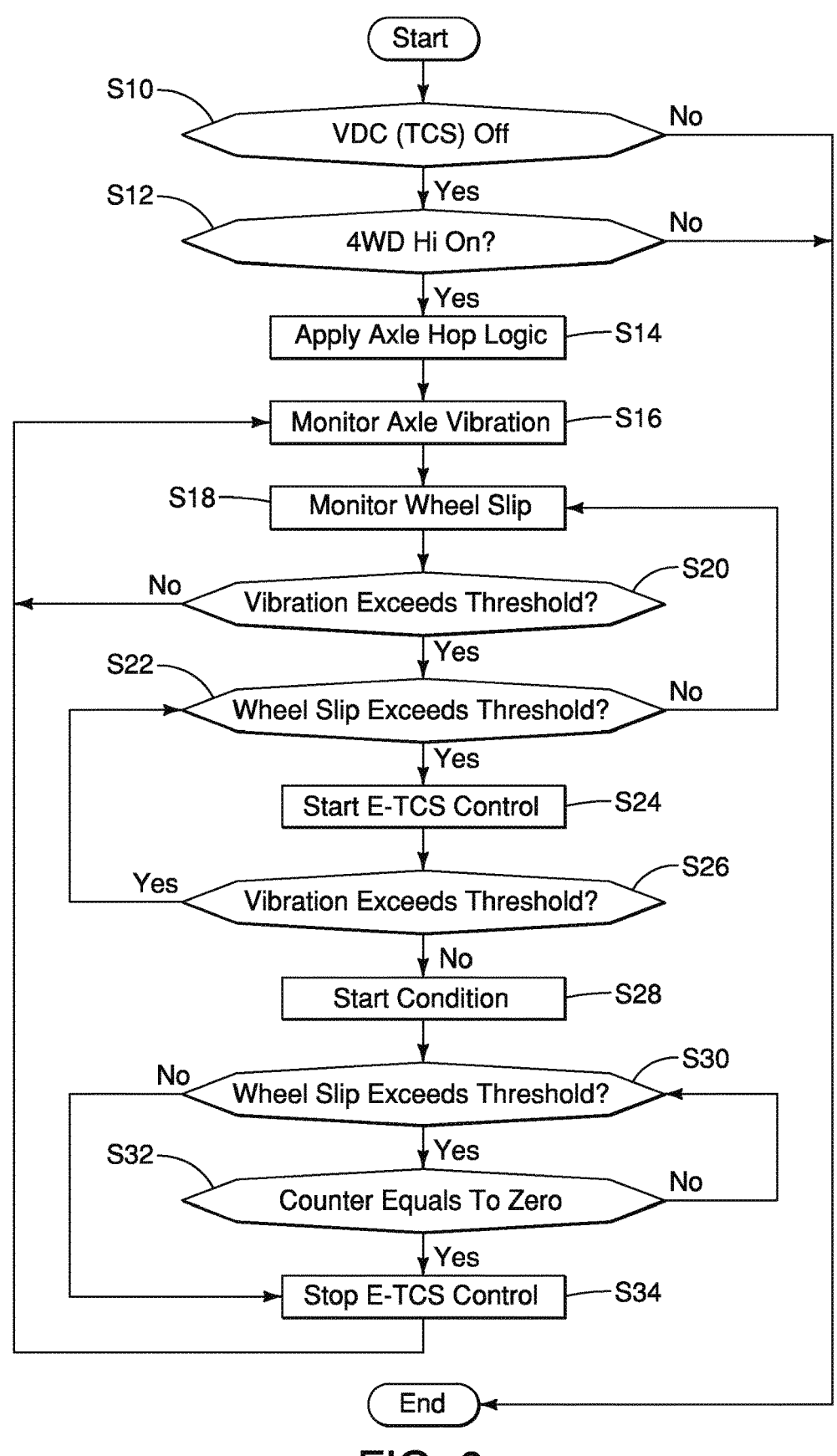
FIG. 6 is a flowchart illustrating a method of controlling axle hop in the vehicle of FIGS. 1 and 2.

During operation of the vehicle 10, the axle hop monitoring system 68 monitors axle vibration and wheel slip at each wheel 20 in accordance with the flowchart shown in FIG. 6. In step S10, the system determines whether the VDC system 42, including the TCS 48, is off. When the VDC system 42 is off, the TCS is off. The second lamp 62 provides a visual indication to the vehicle operator whether the VDC system 42 is on or off. The VDC button 66 is operated to switch the VDC system between activated (on) and deactivated (off) modes. When the VDC system 42 is determined to be on, the process ends. When the VDC system is determined to be off, the process moves to step S12.

In step S12, the system determines whether the vehicle is operating in 4WD high mode. The first lamp 60 provides a visual indication to the vehicle operator whether the vehicle is operating in the 4WD high mode. The 4WD knob 64 is operated to control the 4WD mode of the vehicle 10. When the 4WD high mode is off, the process ends. When the 4WD high mode is on, the process moves to step S14.

In step S14, the axle hop logic of the axle hop monitoring system 68 is initiated. The wheel speed detected by the first sensor 36 is used to determine axle vibration at a wheel 20 in step S16. Alternatively, the second sensor 40 can be used to determine axle vibration at the wheel 20. In step S18, the wheel speed detected by the first sensor 36 is used to determine wheel slip at the same wheel 20.

In step S20, the electronic controller 34 determines whether the detected axle vibration exceeds a first predetermined threshold. When the detected axle vibration does not exceed the first predetermined threshold, the process ends. When the detected axle vibration exceeds the first predetermined threshold, the process moves to step S22. The axle vibration is detected in Hz.

Figure 7:
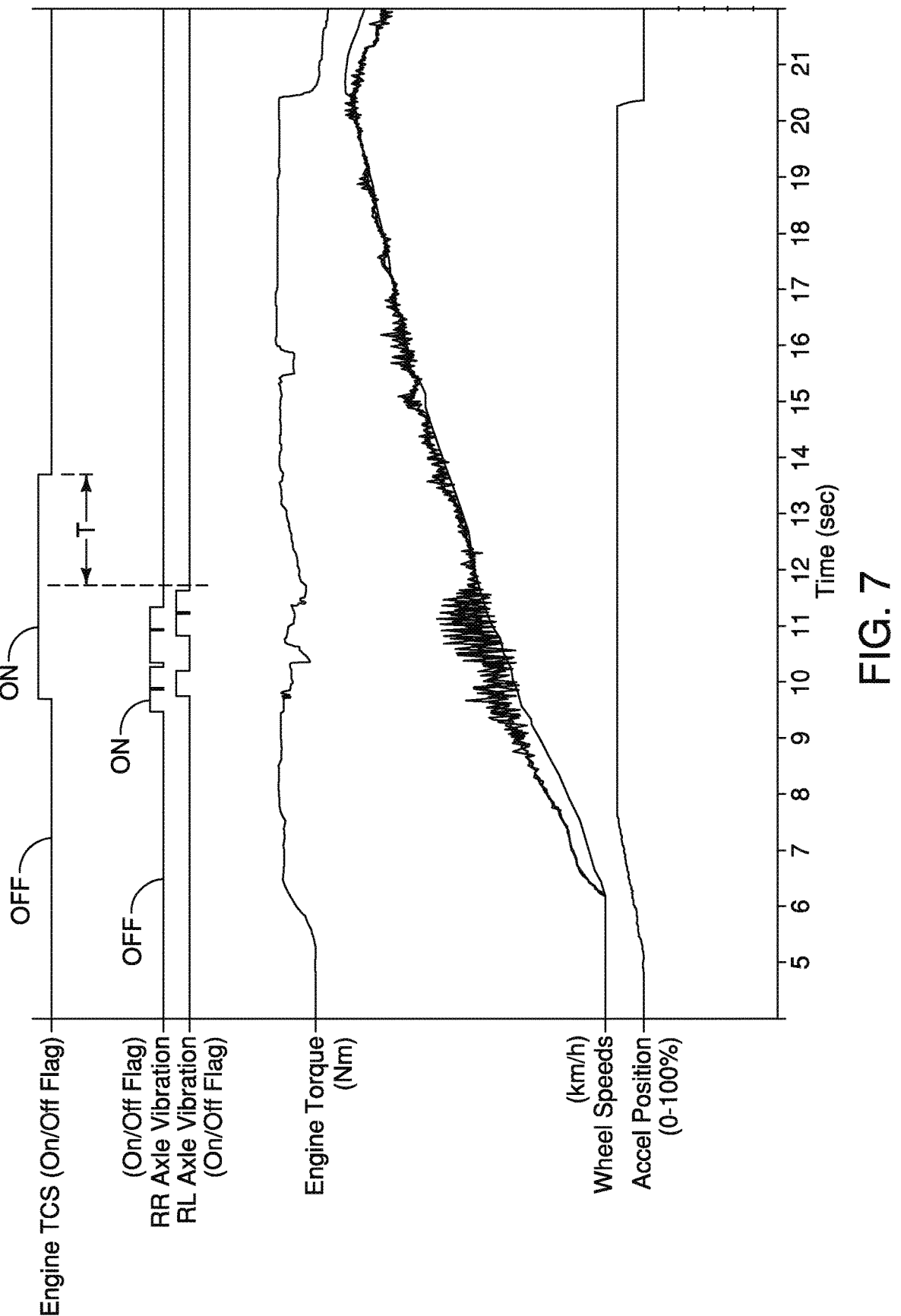
FIG. 7 is a graph illustrating vehicle measurements over time in the vehicle equipped with the axle hop control system of FIGS. 2 and 6.

In step S22, the electronic controller 34 determines whether the detected wheel slip exceeds a second predetermined threshold. When the detected wheel slip does not exceed the second predetermined threshold, the process returns to step S18. The process continues to loop when the detected axle vibration exceeds the first predetermined threshold, but the detected wheel slip does not exceed the second predetermined threshold. When the detected wheel slip exceeds the second predetermined threshold after determining that the detected axle vibration exceeds the first predetermined threshold, the process moves to step S24, The wheel slip is detected in mph (miles per hour) or kph (kilometers per hour). As shown in FIG. 7, at a time between nine and ten seconds, axle vibration of the rear left wheel is detected. At this time, wheel slip is also detected based on the indicated wheel speed.

In step S24, control by the TCS 48 (or Engine TCS, E-TCS) is started. The TCS is turned on as shown in FIG. 7. Prior to initiating the TCS 48, the TCS is in an off condition, as determined in step S10. The TCS 48 operates in a conventional manner, such as reducing torque output by the power plant E. As shown in FIG. 7, the engine torque is reduced when the TCS control is started between nine and ten seconds.

As shown in FIG. 6, the TCS 48 is started when one of the detected axle vibration exceeds the first predetermined threshold or the detected wheel slip exceeds the second predetermined threshold. As shown in steps S20 and S22, the TCS 48 is started when the detected axle vibration exceeds the first predetermined threshold and the detected wheel slip exceeds the second predetermined threshold.

The process moves to step S26 in which the controller 34 determines whether the detected axle vibration at the wheel 20 still exceeds the first predetermined threshold. When the detected axle vibration still exceeds the first predetermined threshold, the process returns to step S22 to determine whether the wheel slip exceeds the second predetermined threshold. When the detected axle vibration exceeds the first predetermined threshold in step S26, the process moves to step S28. As shown in FIG. 7, axle vibration of the rear left wheel continues to exceed the first predetermined threshold until between eleven and twelve seconds. The process loops back to step S22 until the detected axle vibration is below the first predetermined threshold, as shown FIG. 7 at a time between eleven and twelve seconds.

In step S28, a start condition is initiated, which includes starting a countdown timer. The countdown timer counts down from a predetermined amount of time T, such as two seconds. Preferably, the predetermined time is an amount of time between one and five seconds, inclusive. As shown in FIG. 7, the axle vibration of the rear left wheel is below the first predetermined threshold between eleven and twelve seconds. The countdown timer is surfed after starting the TCS 48 and determining that the detected axle vibration is equal to or less than the first predetermined threshold.

The process moves to step S30 in which the controller 34 determines whether the wheel slip exceeds the second predetermined threshold. When the detected wheel slip does not exceed (i.e., is equal to or less than) the second predetermined threshold, the process moves to step S34 in which the control by the TCS is stopped. The TCS control is stopped even though the countdown timer has not reached zero. When the detected wheel slip exceeds the second predetermined threshold, the process moves to step S32.

In step S32, the controller 34 determines whether the countdown timer has reached zero. When the countdown timer has reached zero, the process moves to step S34 in which control by the TCS is stopped. When the countdown timer has not reached zero, the process returns to step S30 to determine whether the detected wheel slip exceeds the second predetermined threshold. Control by the TCS is stopped when the countdown timer reaches zero (step S32) or when the detected wheel slip does not exceed the second predetermined threshold (step S30).

When the process reaches step S34, control by the TCS is stopped. The process returns to step S16 in which axle vibration is monitored. As shown in FIG. 7, the TCS is stopped after the predetermined amount of time T has reached zero. Disengaging the VDC or disengaging 4WD high mode stops the axle hop control system illustrated in FIG. 6.

The axle hop control system illustrated in FIG. 6 is applicable to each wheel 20 of the vehicle 20.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the system and method of controlling axle hop in a vehicle. Accordingly, these terms, as utilized to describe the present invention should be interpreted relative to a vehicle equipped with the system and method of controlling axle hop in a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A control system for controlling axle hop in a vehicle, the control system comprising:

a sensor configured to detect a vibration of an axle and to detect a wheel slip of a wheel;

an electronic controller configured to determine that an engine traction control system is turned off;

determine that a four-wheel drive high system is turned on upon determining that the engine traction control system is turned off;

determine whether the detected axle vibration exceeds a first predetermined threshold and the detected wheel slip exceeds a second predetermined threshold upon determining that the engine traction control system is turned off and that the four-wheel drive high system is turned on; and start an engine traction control system upon determining that the detected axle vibration exceeds the first predetermined threshold and that the detected wheel slip exceeds the second predetermined threshold.

2. The control system according to claim 1, wherein the electronic controller is further configured to stop the engine traction control system upon determining that the detected wheel slip is equal to or less than the second predetermined threshold.

3. The control system according to claim 1, wherein the electronic controller is further configured to start a countdown timer after starting the engine traction control system and determining that the detected axle vibration is equal to or less than the first predetermined threshold.

4. The control system according to claim 3, wherein the electronic controller is further configured to stop the engine traction control system upon determining that the detected wheel slip is equal to or less than the second predetermined threshold.

5. The control system according to claim 3, wherein the electronic controller is further configured to stop the engine traction control system when the countdown timer is zero.

6. The control system according to claim 5, wherein the electronic controller is further configured to stop the engine traction control system before the countdown timer reaches zero upon determining that the detected wheel slip is equal to or less than the second predetermined threshold.

7. The control system according to claim 1, wherein the sensor includes a first sensor configured to detect the vibration of the axle and a second sensor configured to detect the wheel slip of the wheel.

8. A method for controlling axle hop in a vehicle, the method comprising the steps of:

detecting a vibration of an axle;

detecting a wheel slip of a wheel;

determine that an engine traction control system is turned off;

determine that a four-wheel drive high system is turned on upon determining that the engine traction control system is turned off;

determining whether the detected axle vibration exceeds a first predetermined threshold and the detected wheel slip exceeds a second predetermined threshold upon determining that the engine traction control system is turned off and that the four-wheel drive high system is turned on;

starting the engine traction control system upon determining that the detected axle vibration exceeds the first predetermined threshold and that the detected wheel slip exceeds the second predetermined threshold; and stopping the engine traction control system upon determining that the detected axle vibration is equal to or less than the first predetermined threshold and that the detected wheel slip is equal to or less than the second predetermined threshold.

9. The method according to claim 8, further comprising starting a countdown timer after starting the engine traction control system and determining that the detected axle vibration is equal to or less than the first predetermined threshold.

10. The method according to claim 9, further comprising stopping the engine traction control system upon determining that the detected wheel slip is equal to or less than the second predetermined threshold.

11. The method according to claim 9, further comprising stopping the engine traction control system when the countdown timer is zero.

12. The method according to claim 11, further comprising stopping the engine traction control system before the countdown time reaches zero upon determining that the detected wheel slip is equal to or less than the second predetermined threshold.

* * * * *